United States Patent
Cho (10) Patent No.: US 9,880,525 B2
(45) Date of Patent: Jan. 30, 2018

(54) POSITIONING APPARATUS AND PLC SYSTEM USING SAME

(75) Inventor: Myoung Chol Cho, Incheon (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 367 days.

(21) Appl. No.: 13/990,379

(22) PCT Filed: Nov. 29, 2011

(86) PCT No.: PCT/KR2011/009159
§ 371 (c)(1),
(2), (4) Date: Jun. 7, 2013

(87) PCT Pub. No.: WO2012/074272
PCT Pub. Date: Jun. 7, 2012

(65) Prior Publication Data
US 2013/0253668 A1    Sep. 26, 2013

(30) Foreign Application Priority Data
Nov. 30, 2010    (KR) .................. 10-2010-0120429

(51) Int. Cl.
G05B 11/01    (2006.01)
G05B 19/19    (2006.01)
G05B 19/05    (2006.01)

(52) U.S. Cl.
CPC .............. *G05B 11/01* (2013.01); *G05B 19/05* (2013.01); *G05B 19/19* (2013.01)

(58) Field of Classification Search
CPC ......... G05B 11/01; G05B 19/05; G05B 19/19
See application file for complete search history.

(56) References Cited

U.S. PATENT DOCUMENTS

| | | | | |
|---|---|---|---|---|
| 3,810,189 A | * | 5/1974 | Casperson | B41J 2/41 346/139 C |
| 4,016,362 A | * | 4/1977 | Bristow | A63F 13/00 345/682 |
| 4,219,824 A | * | 8/1980 | Asai | G01D 15/10 347/190 |

(Continued)

FOREIGN PATENT DOCUMENTS

| CN | 101789743 | 7/2010 |
|---|---|---|
| JP | 2007-058471 | 3/2007 |

(Continued)

OTHER PUBLICATIONS

English translation of abstract of Japanese patent "JP 2007058471 A" by Yang, Zoo Il published on Mar. 8, 2007 in Japan.*

(Continued)

*Primary Examiner* — Kenneth M Lo
*Assistant Examiner* — Michael J. Huntley
(74) *Attorney, Agent, or Firm* — K&L Gates, LLP (57) ABSTRACT

Disclosed are a positioning apparatus and a PLC system using the same. The positioning apparatus of the present invention generates, for every control period, a pulse signal for indicating the position of an object to be controlled, determines the current position of the object to be controlled using the pulse signal, and if the current position is a specific position, controls the object to be controlled in synchronization with the specific position.

13 Claims, 7 Drawing Sheets

(56) References Cited

U.S. PATENT DOCUMENTS

| | | | | |
|---|---|---|---|---|
| 4,356,439 | A | * | 10/1982 | Mott ................ G05D 23/1917 318/603 |
| 4,475,666 | A | * | 10/1984 | Bilbrey .................. B01L 3/021 222/14 |
| 4,653,878 | A | * | 3/1987 | Nakasato ............... G02B 21/26 359/381 |
| 4,797,757 | A | * | 1/1989 | Haitani ................ G11B 21/083 360/77.08 |
| 5,322,987 | A | * | 6/1994 | Thomas ................ B23K 26/06 219/121.68 |
| 5,966,303 | A | * | 10/1999 | Youn ...................... G05B 19/40 318/560 |
| 6,121,744 | A | * | 9/2000 | Hoda ....................... H02P 8/18 318/671 |
| 7,646,230 | B2 | * | 1/2010 | Parfitt ................. G05B 19/054 327/265 |
| 2005/0043824 | A1 | * | 2/2005 | Wu ........................ G05B 19/05 700/18 |
| 2010/0327796 | A1 | * | 12/2010 | Koshobu ................ G05B 19/19 318/625 |

FOREIGN PATENT DOCUMENTS

| | | |
|---|---|---|
| KR | 10-2006-0005444 | 1/2006 |
| KR | 10-2010-0103944 | 9/2010 |

OTHER PUBLICATIONS

Korean Intellectual Property Office Application Serial No. 10-2010-0120429, Office Action dated Feb. 21, 2014, 3 pages.

The State Intellectual Property Office of the People's Republic of China Application Serial No. 201180057768.7, Office Action dated Nov. 4, 2014, 7 pages.

* cited by examiner

POSITIONING APPARATUS AND PLC SYSTEM USING SAME

CROSS-REFERENCE TO RELATED APPLICATIONS

This application is the National Stage filing under 35 U.S.C. 371 of International Application No. PCT/KR2011/009159, filed on Nov. 29, 2011, which claims the benefit of earlier filing date and right of priority to Korean Patent Application No. 10-2010-0120429, filed on Nov. 30, 2010, the contents of which are all hereby incorporated by reference herein in their entirety.

TECHNICAL FIELD

The present invention relates to a position determination apparatus, and more particularly to a positioning apparatus configured to be used in a PLC (Programmable Logic Controller) system.

BACKGROUND ART

Disclosure

In general, a position determination module in special modules of PLC applied to a factory automation system is configured to control a motor.

That is, one of the essential functions of the position determination module is to output a pulse for driving a servo drive. Mechanical devices applied to many systems are driven by a motor, such that the position determination module plays a very important part in the PLC system.

The thus-mentioned conventional PLC system is configured to monitor a position of a position determination module in a CPU module, and to allow an output module to activate an output if a current position reaches a predetermined position. At this time, there is a problem in that time is delayed, because the CPU module performs a reading of a current position from the position determination module.

Furthermore, the time delay problem is generated in a process of determining if a current position read by the CPU module from the position determination module is a synchronous position, and transmitting an output activation command to the output module.

Still furthermore, a random change is generated at a data exchange time between the CPU module and the position determination module, because a scan time of the CPU module and a control period of the position determination module are different in the conventional PLC system. In addition, a random change is also generated in an output delay time that sends a synchronized time to a predetermined particular position.

These types of phenomenon pose a serious problem that harms accuracy of equipment applied with the conventional PLC system.

Technical Problem

The present invention is provided to solve the aforementioned problems and the present invention provides a PLC positioning apparatus configured to improve the control accuracy of a PLC system relative to an outside device and to ease a design and a manufacturing by directly generating an output signal for accurately activated outside control at a predetermined particular position, and to be stably applicable to various applications and outside devices, and a PLC system using the same.

Technical Solution

In one general aspect of the present disclosure, there is provided a positioning apparatus configured to be applicable to a PLC (Programmable Logic Controller), the positioning apparatus comprising: a pulse generator configured to generate a pulse signal indicating a position of a control object at each control period; and a synchronized position output generator configured to: determine a current position of the control object using the pulse signal, and perform a control synchronized to a particular position relative to the control object when the current position corresponds to the particular position.

In some exemplary of the present invention, the positioning apparatus may further comprise a first controller configured to determine the number of pulses in the pulse signals generated by the pulse generator at each control period.

In some exemplary of the present invention, the pulse generator may generate the pulse signal corresponding to the number of pulses.

In some exemplary of the present invention, the synchronized position output generator may comprise a synchronized position buffer unit configured to store a value of the particular position, a pulse counting unit configured to count a value of the current position through the pulse signal, and a position comparator configured to allow the control synchronized to the particular position to be performed when the value of the particular position and the value of the current position are substantially same.

In some exemplary of the present invention, the synchronized position output generator may further comprise an on-pulse generator configured to generate a synchronized position output signal to allow a control synchronized to the particular position to be performed when the value of the particular position and the value of the current position are determined substantially same by the position comparator.

In some exemplary of the present invention, the synchronized position output generator may further comprise an output delay register configured to determine an output delay time of the synchronized position output signal, and an output length register configured to determine an on-state keep time of the synchronized position output signal.

In some exemplary of the present invention, the synchronized position output generator may further comprise a second controller configured to generate an initialization request signal relative to the value of the current position.

In some exemplary of the present invention, the pulse counting unit may initialize the value of the current position by receiving the initialization request signal.

In some exemplary of the present invention, the synchronized position output generator may further comprise a preset position register configured to store an initialized value to allow the pulse counting unit to initialize the value of the current position.

In other general aspect of the present disclosure, there is provided a PLC system performing a control to an outside device using a positioning apparatus, the PLC system comprising: a power module configured to supply a power; and a positioning apparatus driven by the supplied power and configured to perform a particular position-synchronized control of a control object when a position of a predetermined control object corresponds to a particular position.

In some exemplary of the present invention, the positioning apparatus may comprise a pulse generator configured to generate a pulse signal indicating a position of a control object at each control period of the control object; a controller configured to determine the number of pulses in the pulse signal generated at each control period; and a synchronized position output generator configured to: determine a current position of the control object using the pulse signal, and perform a control synchronized to the particular position relative to the control object when the current position corresponds to the particular position.

In some exemplary of the present invention, the synchronized position output generator may comprise a synchronized position buffer unit configured to store a value of the particular position, a pulse counter configured to count a value of the current position through the pulse signal, a position comparator configured to determine when the value of the particular position and the value of the current position are substantially same by comparing the value of the particular position and the value of the current position, and an on-pulse generator configured to generate a synchronized position output signal to allow a control synchronized to the particular position to be performed when the value of the particular position and the value of the current position are determined substantially same.

Advantageous Effects

The exemplary embodiments of the present disclosure has an advantageous effect in that an operation performed by a CPU module of a conventional PLC system through a sequence program is performed by a positioning apparatus per se to improve control accuracy of a PLC system and to ease the design and manufacturing.

The exemplary embodiments of the present disclosure has another advantageous effect in that a PLC positioning apparatus is allowed to directly generate an output signal enabling accuracy control of an outside device, and to designate an output delay time and an activation keep time of the output signal for stable application to various applications and outside devices.

BEST MODE

Various exemplary embodiments will be described more fully hereinafter with reference to the accompanying drawings, in which some exemplary embodiments are shown.

The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a PLC position determining apparatus according to prior art will be initially explained with reference to the accompanying drawings and then, exemplary embodiments of the present disclosure will be described in detail.

Figure 1:
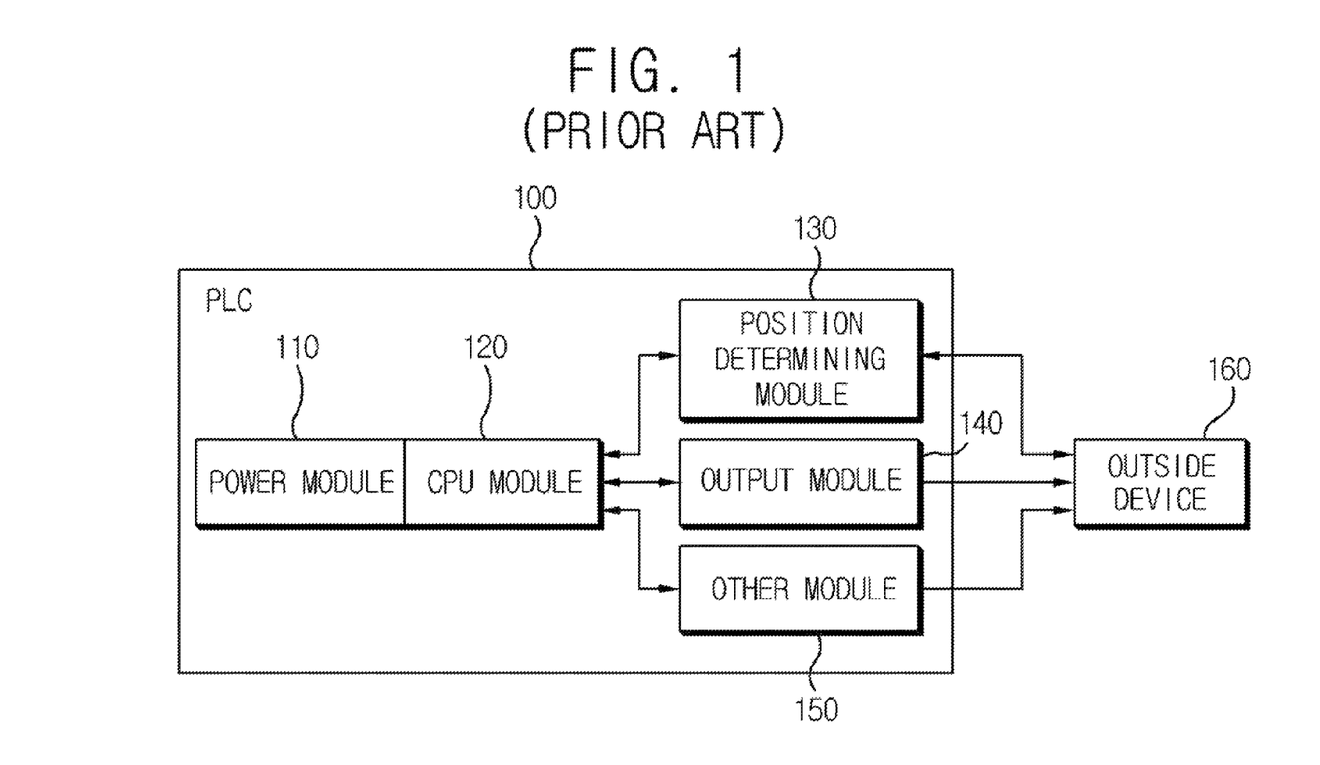
FIG. 1 is a block diagram illustrating a PLC system according to prior art.

FIG. 1 is a block diagram illustrating a PLC system according to prior art.

Referring to FIG. 1, the conventional PLC system includes (100) a power module (110), a CPU module (120), a position determination module (130), an output module (140) and other modules (150). The PLC (Programmable Logic Controller) is an integrated device capable of performing control functions of various conventional relays, timers and counters by a program using a micro processor. NEMA (National Electrical Manufacturers Association) defines the PLC system as "a digital computer using a programmable memory and controlling various types of machines and processes for performing specific functions such as logic, sequencing, timing, counting and operation through a digital or analogue input/output module".

Furthermore, the PLC can also perform sequence controls, arithmetic operations, logic operations, function operations, adjustability operations and data processing, and is excellent in reliability of control function compared with the existing relay. The PLC also can easily correct or change control contents.

Figure 2:
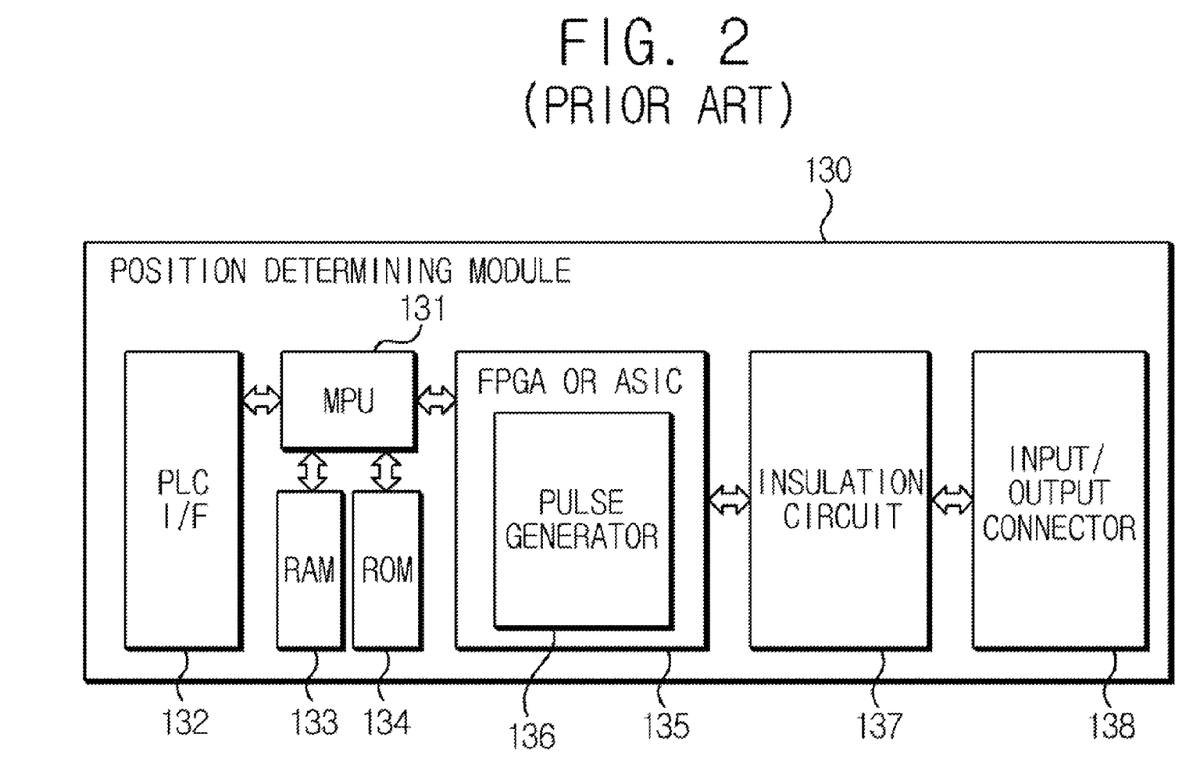
FIG. 2 is a detailed block diagram illustrating a position determining module in the PLC system of FIG. 1.

The PLC is widely used for various automation systems including process control devices, and particularly an indispensable essential element in building up a CIM (Computer Integrated Manufacturing) due to its being communicable with a computer. FIG. 2 is a detailed block diagram illustrating a position determining module in a PLC system of FIG. 1.

Referring to FIG. 2, a conventional position determining module (130) includes an MPU (Micro Processor Unit, 131), a PLC interface unit (132), a RAM (133), a ROM (134), a pulse generator (136), an insulation circuit (137) and an input/output connector (138).

The MPU (131) takes charge of an overall control of the position determining module, the PLC interface unit (132) functions to perform a data exchange with the CPU module (120) of the PLC system. In general, a pulse output type position determining module embodies the pulse generator (136) through a FPGA (Field-Programmable Gate Array) or an ASIC (Application Specific Integrated Circuit, 135). A pulse generated by the pulse generator (136) is outputted to a servo drive through the insulation circuit (137) and the input/output connector (138).

As noted from the foregoing, an essential function of the position determining module (130) that operates by being mounted on the PLC system (100) is to output a pulse for driving the servo drive. The position determining module (130) is disposed with a position determining data (target position, target speed, acceleration/deceleration time) for driving the servo drive.

The CPU module (120) of the PLC system (100) executes a start command based on position determining data, specific position or speed of the position determining module (130). The position determining module (130) receives the start command from the CPU module (120) to generate a pulse, and transmits a position value outputted at each control period to the CPU module (120).

The CPU module (120) keeps monitoring a currently-outputted position value of the position determining module (130) and drives an output module (140) when reaching a predetermined position, and performs a sequence operation controlling an outside device (160) including cutting, transferring and hydraulic controlling according to applications.

However, there is generally an unscheduled delay time unable to accurately control the outside device (160), because the CPU module (120) checks a specific position from the position determining module (130) and outputs an output to the output module (140) even in a situation where a scan time of the PLC system (100), a control period of the position determining module (130) and a time of transmitting data to the output module (140) are not appropriately matched.

Figure 3:
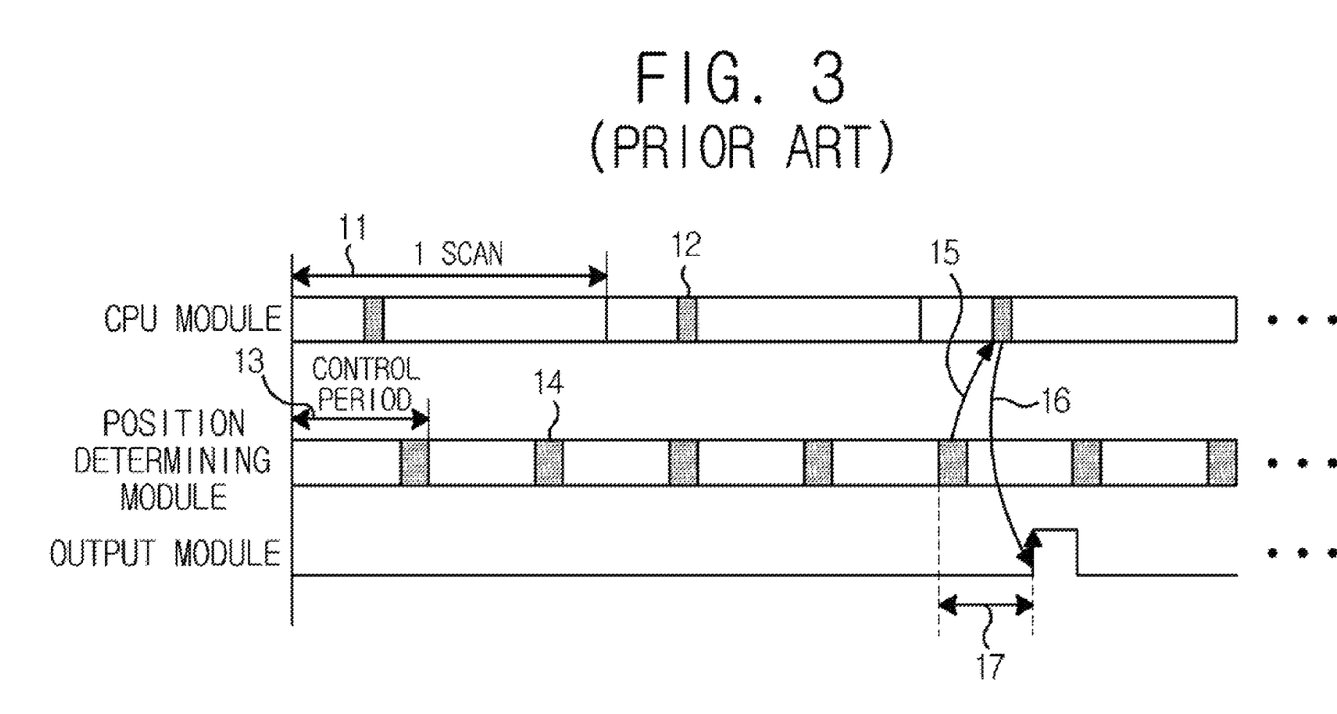
FIG. 3 is a schematic view illustrating an operation timing of a CPU module, a position determining module and an output module of the PLC system of FIG. 1.

FIG. 3 is a schematic view illustrating an operation timing of a CPU module, a position determining module and an output module of the PLC system of FIG. 1.

Referring to FIG. 3, the CPU module (120) of the PLC system (100) operates by preparing a sequence program. In general, a time when the sequence program is operated is called a scan time (11). The scan time (11) has a variable period or a predetermined period in response to a program.

The CPU module (120) in one scan time (11) performs a data writing to the position determining module (130) and a position determining module data exchange (12) reading out a data from the position determining module (130).

The position determining module (130) generally operates at a predetermined control period (13). The position determining module (130) transmits the number of pulses to be outputted to the pulse generator (136) at every control period (13).

The position determining module (130) performs a position determining module state write (14) in which currently outputted position, speed and states of other position determining module are transmitted to the CPU module (120) at every control period (13). The CPU module (120) can read the data of the position determining module (130) through the position determining module data exchange (12) after the position determining module state write (14) is performed (15).

The sequence program of the CPU module (120) transmits a command activating an output to the output module (140) in response to a program condition (16).

As noted from the foregoing, the PLC system (100) using the position determining module (130) monitors a current position from the position determining module (130), and activates (on) the output to the output module (140) if the current position corresponds to a particular position, and controls the outside device (160).

However, at this time, there is generated a time delay in performing, by the CPU module (120), the current position write (15) from the position determining module (130). Furthermore, a time delay is also generated in transmitting an output activation command to the output module (140) by determining whether the position read by the CPU module (120) from the position determining module (130) is a synchronous position capable of performing the control.

In addition, there is generated a problem where a time of performing the state write (14) by the position determining module (130) and a time of performing the position determining module data exchange (12) by the CPU module (120) are different at every time, because the scan time (11) of the CPU module (120) and the control period (13) of the position determining module (130) are mutually different.

Hence, the time of performing, by the CPU module (120), the position comparison through the sequence program becomes unstable, and an output delay time (17) generated when an output synchronized to a particular position also becomes unstable. These problems pose a serious factor harming the accuracy in controlling the outside device (160).

Figure 4:
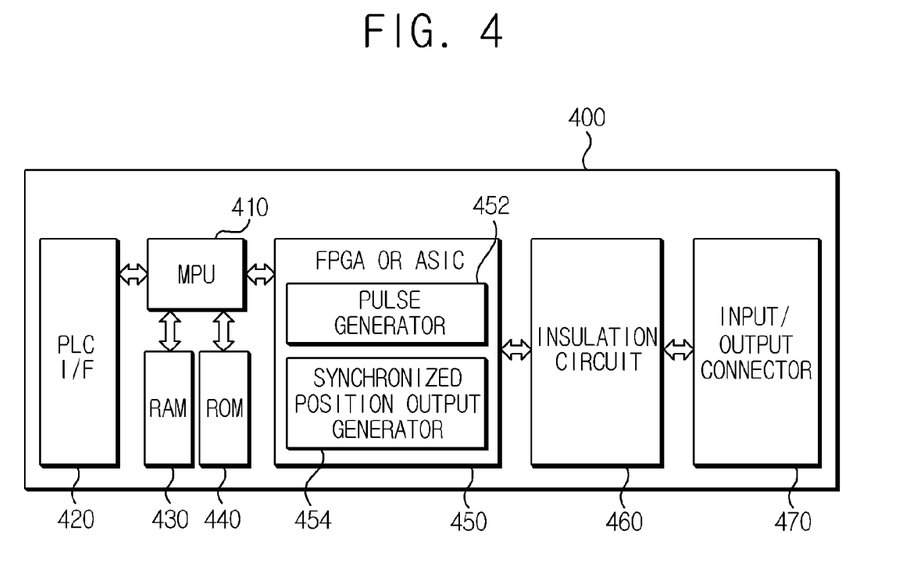
FIG. 4 is a block diagram illustrating a PLC positioning apparatus according to an exemplary embodiment of the present disclosure.
Figure 5:
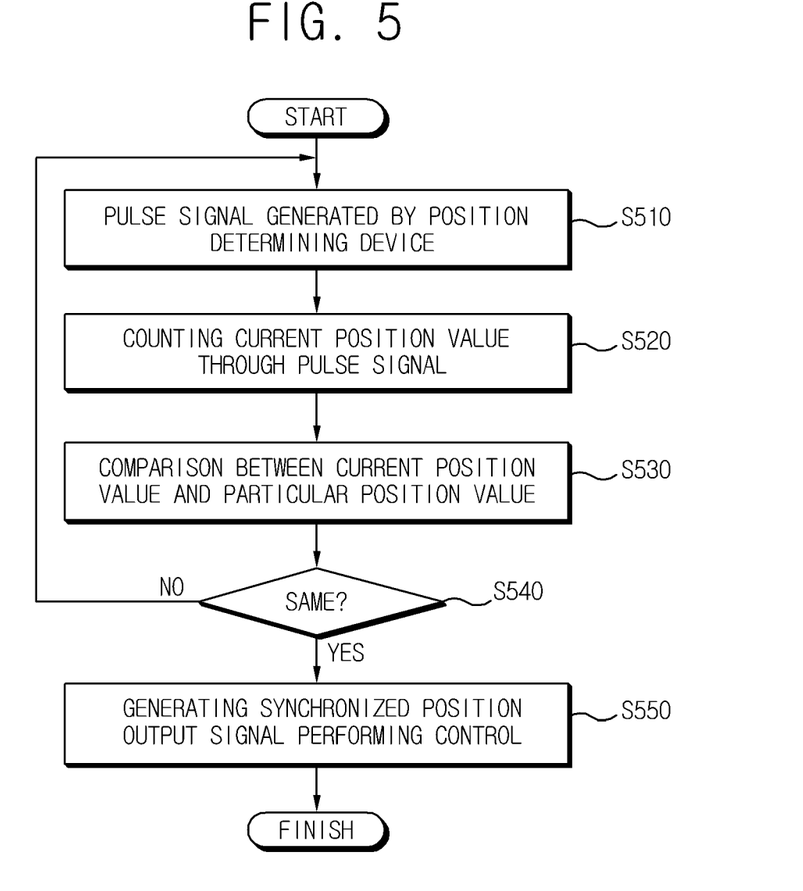
FIG. 5 is a flowchart illustrating a PLC position determining method according to the present disclosure.

FIG. 4 is a block diagram illustrating a PLC positioning apparatus according to an exemplary embodiment of the present disclosure, and FIG. 5 is a flowchart illustrating a PLC position determining method according to the present disclosure.

Referring to FIGS. 4 and 5, a PLC determining apparatus (400) includes a pulse generator (452) and a synchronized position output generator (454). Furthermore, the PLC determining apparatus (400) includes an MPU (410) controlling an overall operation of the PLC positioning apparatus (400), a PLC interface unit (420) performing data exchange with the CPU module of PLC system, a data writable and readable RAM (430), a data readable ROM (440), an insulation circuit (460) for outputting an output signal of the PLC positioning apparatus (400) and an input/output connector (470).

The PLC positioning apparatus (400) according to the present disclosure is driven by receiving a power from a power module supplying a power to the PLC system, and performs a control synchronized to a particular position relative to a relevant control object if a position of a predetermined control object corresponds to the particular position.

To be more specific, first of all, the pulse generator (452) generates a pulse signal indicating a position of a control object at every control period (S510). In this case, the MPU (410) may determine the number of pulses in a pulse signal generated at every control period, and the pulse generator (452) may generate a pulse signal corresponding to the number of pulses.

Next, the synchronized position output generator (454) determines a current position of a control object by using the pulse signal, and performs the control synchronized to the particular position relative to the control object if the current position corresponds to the particular position (S520~S550).

In the exemplary embodiment of the present disclosure, the PLC positioning apparatus (400) may include the synchronized position output generator (454) inside an FPGA (450) realized by the pulse generator (452), for example.

That is, the PLC positioning apparatus (400) counts a current position of a control object inside the FPGA (S520), the output generator (454) compares the current position with the particular position to be controlled (S530, S540) and generates an output signal synchronized to the particular position (S550).

As noted from the foregoing, in the exemplary embodiment of the present disclosure, operations performed through the sequence program by the conventional CPU module of the PLC are performed by the PLC positioning apparatus (400) per se, whereby control accuracy of the PLC system to the outside device can be improved, and design and manufacturing can be eased.

Figure 6:
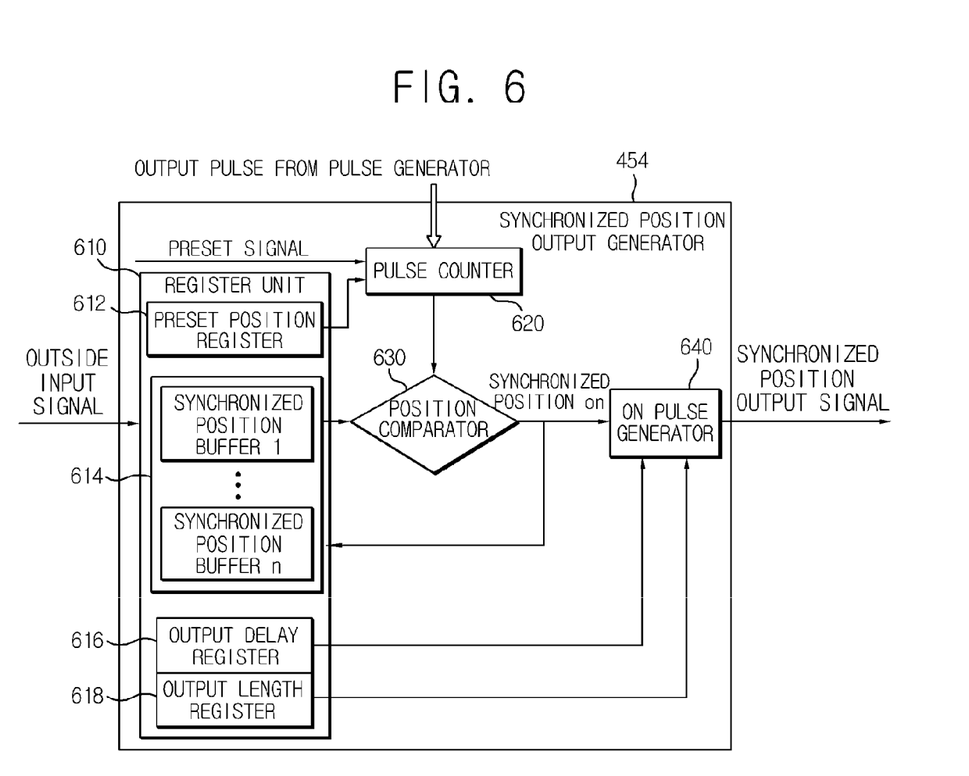
FIG. 6 is a detailed block diagram illustrating a synchronized position output generator of FIG. 4 according to an exemplary embodiment of the present disclosure.

FIG. 6 is a detailed block diagram illustrating a synchronized position output generator of FIG. 4 according to an exemplary embodiment of the present disclosure.

Referring to FIG. 6, the synchronized position output generator (454) includes a synchronized position buffer unit (614), a pulse counter (620) and a position comparator (630).

The synchronized position buffer unit (614) stores a value of a particular position on which control to a control object is to be performed. In exemplary embodiment of the present disclosure, the synchronized position buffer unit (614) may include a plurality of synchronized position buffers.

The pulse counter (620) counts a value of a current position using the pulse signal (S520). For example, the pulse counter (620) increases or decreases a position value already outputted in response to the inputted pulse signal to calculate a value of the current position whenever a pulse signal generated by the pulse generator (452) is inputted.

Furthermore, the position comparator (630) compares (S530) the value of the particular position with the value of the current position and performs the control to the control object, if it is determined that both values are substantially same (S540).

In exemplary embodiment of the present disclosure, the synchronized position output generator (454) may further include an on pulse generator (640), where the on pulse generator (640) may generate a synchronized position output signal for performing the control if it is determined by the position comparator (630) that a value of a current position and a value of a particular position are substantially same (S550).

To be more specific, the position comparator (630) compares a value of a current position which is a pulse value counted by a pulse counter (620) and a value of a synchronized position buffer 1 at the synchronized position buffer unit (614) set up by a user, for example. If the value of a current position and the value of a synchronized position buffer 1 are substantially same, the position comparator (630) generates a synchronized position on signal. The synchronized position on signal is inputted into the on pulse generator (640).

In exemplary embodiment of the present disclosure, the synchronized position on signal may be also inputted into the synchronized position buffer unit (614), where if the synchronized position on signal is activated, the synchronized position buffer unit (614) transmits a value of a synchronized position buffer 2 to a position comparator (230) for use of next comparison of synchronized positions.

In exemplary embodiment of the present disclosure, the synchronized position output generator (454) may further include an output delay register (616) and an output length register (618). The output delay register (616) determines an output delay time of a synchronized position output signal and the output length register (618) determines a keep time of on state (activated state) of the synchronized position output signal.

Figure 7:
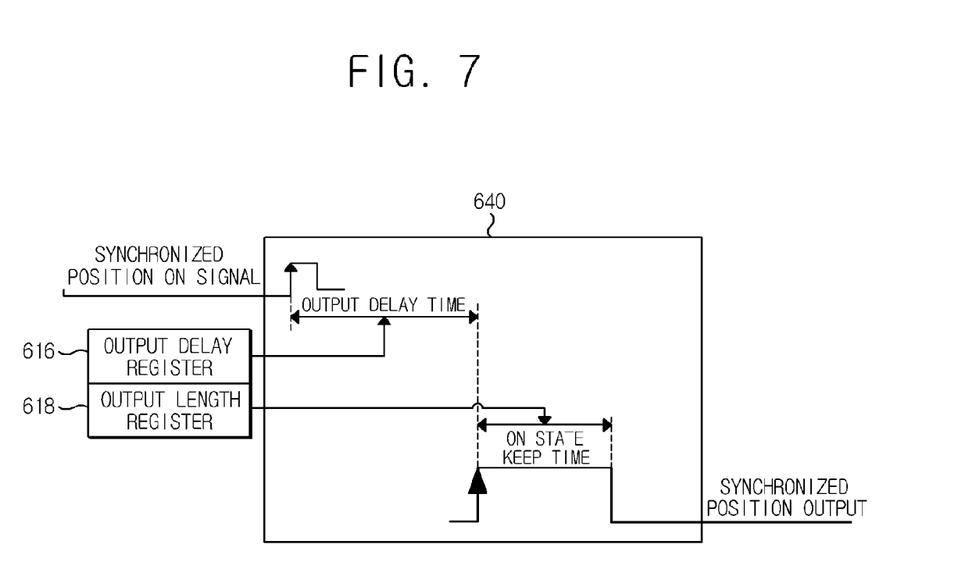
FIG. 7 is a schematic view illustrating an operation of an on-pulse generator of FIG. 6 according to an exemplary embodiment of the present disclosure.

FIG. 7 is a schematic view illustrating an operation of an on-pulse generator of FIG. 6 according to an exemplary embodiment of the present disclosure.

Referring to FIG. 7, in a case the synchronized position output signal is generated by the position comparator (630), the on pulse generator (640) activates the synchronized position output signal after as much time as determined by the output delay register (616) has lapsed.

Furthermore, the on state of the synchronized position output signal is kept for much time as determined by the output length register (618), and then turned off.

In exemplary embodiment of the present disclosure, a designer or a user may pre-set an output delay time of the output delay register (616) and an output keep time of the output length register (618). In this case, a flexible use is possible according to applications, because a delay time up to generation of the synchronized position output signal after detection of synchronized position can be arbitrarily determined.

Furthermore, because the on state keep time of the synchronized position output can be arbitrarily determined, a stable application can be made to various outside devices (160) that recognize the synchronized position output signal.

In exemplary embodiment of the present disclosure, the MCU (410) may generate an initialization request signal relative to a value of current position, and the pulse counter (620) may receive the initialization request signal to initialize the value of the current position.

At this time, the synchronized position output generator (454) may further include a preset position register (612) storing the initialized value to allow the pulse counter (620) to initialize the value of the current position.

In exemplary embodiment of the present disclosure, the preset position register (612), the synchronized position buffer unit (614), the output delay register (616) and the output length register (618) may be realized by a type of register unit (610) capable of performing a user set-up. In this case, a user can set up the register unit (610) using software tool that sets the function of the positioning apparatus (400).

The preset position register (612) is set up with an initialization value that is required when performing, by a user, an original point returning function or a current position preset function. The synchronized position buffer unit (614) is set up with a particular synchronized position from which a synchronized position output signal is desired to be outputted.

In exemplary embodiment of the present disclosure, the synchronized position buffer unit (614) may include a plurality of synchronized position buffers in response to a relevant application.

The output delay register (616) is set up with a delay time until the synchronized position output signal is outputted, after the synchronized position on signal is detected. Furthermore, the output length register (618) is set up with activated keep time of the synchronized position output signal.

After these set-ups, in a case position-changing function such as original point returning function or the current position preset function is executed by the MCU (410), the MCU (410) generates a preset signal. In a case the present signal is generated, the pulse counter (620) initializes a value of the current position using a value set up at the pre-set position register (612).

Successively, a synchronized position output signal generated by the synchronized position output generator (454) is transmitted to a control object through the insulation circuit (460) and the input/output connector (470).

INDUSTRIAL APPLICABILITY

As apparent from the foregoing, in a case the positioning apparatus according to exemplary embodiments of the present disclosure is applied to a PLC system, a control signal (synchronized position output signal) relative to a control object is generated by the positioning apparatus instead of the CPU module of PLC system.

In some exemplary embodiments, the exemplary embodiment of the present disclosure can be realized in a shape of a system on chip on a microprocessor to allow the microprocessor to perform the position determining method and function of the PLC as mentioned above.

In a case the exemplary embodiments of the present disclosure are realized by a microprocessor, there are advantages in that sizes of various systems can be reduced, assembly processes can be simplified and manufacturing costs can be saved.

As apparent from the foregoing exemplary embodiments of the present disclosure, a synchronized position output generator corresponding to a predetermined output circuit is included in the PLC positioning apparatus per se, a pulse signal generated by a pulse generator can be counted in real time by the synchronized position output generator to enable comparison between a current position and a synchronized position to a single pulse unit and to generate an accurate control signal for control of outside devices.

Furthermore, in the foregoing exemplary embodiments of the present disclosure, a delay time up to an output of a control signal and a length of a control signal can be set up using an output delay register, an output length register and an on pulse generator, to thereby enable application to various applications and generation of a stable control signal.

Although the present disclosure has been described with reference to a number of illustrative embodiments thereof, it should be understood that numerous other modifications and embodiments can be devised by those skilled in the art that will fall within the spirit and scope of the principles of this disclosure.

The invention claimed is:

1. A positioning apparatus for a PLC (Programmable Logic Controller) system that performs position-synchronized control of a control object of the PLC system, the positioning apparatus comprising:
    a pulse generator configured to generate a pulse signal indicating a position of a control object at each control period; and
    a synchronized position output generator configured to:
        determine a current position of the control object using the pulse signal; and
        directly perform control synchronized to a specific position relative to the control object without exchanging data with a CPU module of the PLC system when the current position corresponds to the specific position,
    wherein the synchronized position output generator comprises:
        a pulse counting unit configured to count a value of the current position via the pulse signal;
        a synchronized position buffer unit comprising a first synchronized position buffer and a second synchronized position buffer each storing a value of the specific position regardless of the count of the pulse counting unit;
        a position comparator configured to compare the value of the current position to a value of the first synchronized position buffer and generate a synchronized position-on signal when the value of the first synchronized position buffer and the value of the current position are substantially same; and
        an on-pulse generator configured to directly generate a synchronized position output signal for performing the control synchronized to the specific position according to the synchronized position-on signal without exchanging data with the CPU module when the value of the first synchronized position buffer and the value of the current position are substantially same,
    wherein the synchronized position-on signal is input to the on-pulse generator and the synchronized position buffer unit,
    wherein the synchronized position buffer unit is configured to transmit a value of the second synchronized position buffer to the position comparator in response to the synchronized position-on signal for a next comparison of the value of the current position to the value of the first synchronized position buffer,
    wherein the synchronized position output generator further comprises:
        an output delay register configured to determine an output-delay time of the synchronized position output signal; and
        an output length register configured to determine an on-state keep time of the synchronized position output signal, and
    wherein at least the output-delay time or the on-state keep time is preset according to applications and various external devices.

2. The positioning apparatus of claim 1, further comprising:
    a controller configured to determine a number of pulses in the pulse signal generated by the pulse generator at each control period.

3. The positioning apparatus of claim 2, wherein the pulse generator is further configured to generate a pulse signal corresponding to the determined number of pulses.

4. The positioning apparatus of claim 1, wherein the synchronized position output generator further comprises:
    a controller configured to generate an initialization request signal relative to the value of the current position.

5. The positioning apparatus of claim 4, wherein the pulse counting unit is further configured to receive the initialization request signal and initialize the value of the current position.

6. The positioning apparatus of claim 5, wherein the synchronized position output generator further comprises:

a preset position register configured to store an initialized value used by the pulse counting unit to initialize the value of the current position.

7. The positioning apparatus of claim 1, wherein the synchronized position output generator further comprises:
an output-delay register configured to determine the output-delay time of the synchronized position output signal; and
an output-length register configured to determine an on-state keep time of the synchronized position output signal.

8. A PLC (Programmable Logic Controller) system performing control of an external device, the PLC system comprising:
a power module configured to supply power; and
a positioning apparatus driven by the supplied power and configured to directly perform position-synchronized control of a control object without exchanging data with a CPU module of the PLC system when a position of the control object corresponds to a specific position, the positioning apparatus comprising:
a pulse generator configured to generate a pulse signal indicating the position of the control object at each control period of the control object;
a controller configured to determine a number of pulses in the pulse signal generated at each control period; and
a synchronized position output generator configured to:
determine a current position of the control object using the pulse signal; and
directly perform control synchronized to the specific position relative to the control object without exchanging data with the CPU module when the current position corresponds to the specific position,
wherein the synchronized position output generator comprises:
a pulse counting unit configured to count a value of the current position via the pulse signal;
a synchronized position buffer unit comprising a first synchronized position buffer and a second synchronized position buffer each storing a value of the specific position regardless of the count of the pulse counting unit;
a position comparator configured to compare the value of the current position to a value of the first synchronized position buffer and generate a synchronized position-on signal when the value of the first synchronized position buffer and the value of the current position are substantially same; and
an on-pulse generator configured to directly generate a synchronized position output signal for performing the control synchronized to the specific position according to the synchronized position-on signal without exchanging data with the CPU module when the value of the first synchronized position buffer and the value of the current position are substantially same,
wherein the synchronized position-on signal is input to the on-pulse generator and the synchronized position buffer unit,
wherein the synchronized position buffer unit is configured to transmit a value of the second synchronized position buffer to the position comparator in response to the synchronized position-on signal for a next comparison of the value of the current position to the value of the first synchronized position buffer,
wherein the synchronized position output generator further comprises:
an output delay register configured to determine an output-delay time of the synchronized position output signal; and
an output length register configured to determine an on-state keep time of the synchronized position output signal, and
wherein at least the output-delay time or the on-state keep time is preset according to applications and various external devices.

9. The PLC system of claim 8, wherein the synchronized position output generator further comprises:
an output-delay register configured to determine the output-delay time of the synchronized position output signal; and
an output-length register configured to determine an on-state keep time of the synchronized position output signal.

10. The PLC system of claim 8, wherein the pulse generator is further configured to generate a pulse signal corresponding to the determined number of pulses.

11. The PLC system of claim 8, wherein the synchronized position output generator further comprises:
a controller configured to generate an initialization request signal relative to the value of the current position.

12. The PLC system of claim 11, wherein the pulse counting unit is further configured to receive the initialization request signal and initialize the value of the current position.

13. The PLC system of claim 12, wherein the synchronized position output generator further comprises:
a preset position register configured to store an initialized value used by the pulse counting unit to initialize the value of the current position.

* * * * *